United States Patent Office 3,236,851
Patented Feb. 22, 1966

3,236,851
UNSATURATED MORPHINAN DERIVATIVES
Yoshiro Sawa and Shin Maeda, Hyogo Prefecture, Japan, assignors to Shionogi & Co., Ltd., Osaka, Japan
No Drawing. Filed Apr. 3, 1963, Ser. No. 270,185
Claims priority, application Japan, Apr. 5, 1962, 37/13,973
10 Claims. (Cl. 260—285)

The present invention relates to unsaturated morphinan derivatives and production thereof.

In the term "morphinan" herein employed, there are included all the compounds having a fundamental structure representable by the following plane formula:

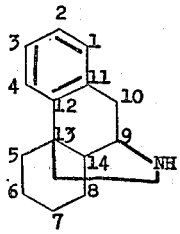

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a - hexahydro-2H-10,4a-iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective unsaturated morphinan derivatives in the present invention are representable by the following plane formula:

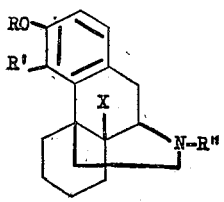

wherein R represents a lower alkyl group (e.g. methyl, ethyl, propyl), R' represents a hydrogen atom, an aryloxy group (e.g. phenyloxy, naphthyloxy) or a substituted aryloxy group (e.g. substituted phenyloxy, substituted naphthyloxy) wherein the substituent is lower alkyl (e.g. methyl, ethyl, propyl), lower alkoxy (e.g. methoxy, ethoxy, propoxy), nitro or amino, R'' represents a lower alkyl group (e.g. methyl, ethyl, propyl), X represents a hydrogen atom, a hydroxyl group or an acyloxy group such as lower alkanoyloxy (e.g. acetyloxy, propionyloxy, butyloxy) and wherein a double bond is present in the C-ring, and show various pharmacological activities such as anti-tussive, analgesic, narcotic, anti-extensor and/or anti-electroshock-convulsant activity.

Accordingly, a basic object of the present invention is to embody the unsaturated morphinans derivative of Formula I. Another object of the invention is to embody the pharamacologically active unsaturated morphinans (I). A further object of the invention is to embody a process for preparing the unsaturated morphinans (I). These and other objects will be apparent to those conversant with the art to which the present invention pertains from the subsequent description.

The process of the present invention is illustratively represented by the following scheme:

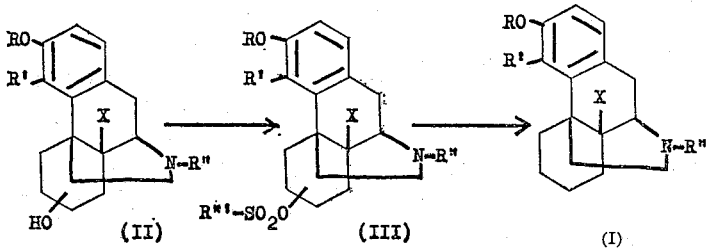

wherein R, R', R'', X each has the same significance as designated above and there is a double bond in ring-C and R''' represents a lower alkyl group (e.g. methyl, ethyl, propyl), an aryl group (e.g. phenyl, tolyl, xylyl) or an ar(lower)alkyl group (e.g. benzyl, phenethyl).

As the starting material, there may be used the optically active or racemic hydroxymorphinan of Formula II.

According to the process of the present invention, the starting hydroxymorphinan (II) is subjected to sulfonylation, followed by deacidation of the resultant sulfonyloxymorphinan of Formula III to give the objective unsaturated morphinan (I). The sulfonylation is accomplished by treating the hydroxymorphinan (II) with a sulfonyl halide (e.g. benzenesulfonyl chloride, benzenesulfonyl bromide, toluenesulfonyl chloride, toluenesulfonyl bromide, methanesulfonyl chloride, ethanesulfonyl bromide) in a basic medium such as a basic organic solvent (e.g. pyridine, picoline, dimethylaniline, diethylamine, triethylamine), a mixture of the said basic organic solvent with a neutral organic solvent (e.g. acetone, dioxane, tetrahydrofuran, ether) and a combination of an inorganic base (e.g. potassium carbonate, sodium carbonate) with the said neutral organic solvent, usually while heating with reflux. The subsequent deacidation is effected by treating the thus-produced sulfonyloxymorphinan (III) with an organic base (e.g. pyridine, picoline, lutidine, collidine) while heating with reflux.

The objective unsaturated morphinans (I) occur in optically active form as well as in racemic mixture and these are all within the scope of the present invention.

The unsaturated morphinans (I) form acid addition salts with organic and inorganic acids. Illustrative acid addition salts include the hydrohalide (e.g. hydrochloride, hydrobromide, hydroiodide), sulfate, phosphate, nitrate, tartrate, salicylate, benzoate, malate, citrate, acetate, etc.

The thus-produced unsaturated morphinans (I) and acid addition salts thereof are useful as anti-tussive, analgesic, narcotic, anti-extensor and/or anti-electroshock-convulsant agents.

Practical and presently preferred embodiments of the present invention are illustrated by the following examples. In the examples, abbreviations each have conventional meanings, e.g. mg.=milligram(s), g.=gram(s), ml=millilitre(s), °C.=degrees centigrade.

EXAMPLE 1

*Preparation of a mixture of (—)-3-methoxy-N-methyl-Δ5-morphinan (cis) and (—)-3-methoxy-N-methyl-Δ6-morphinan (cis)*

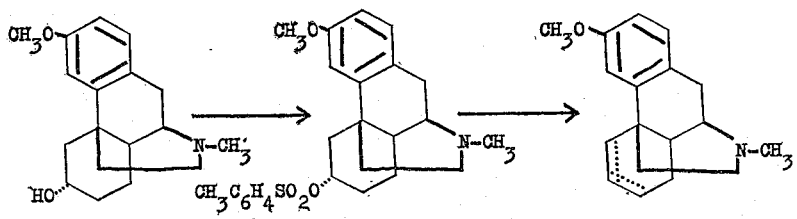

A mixture of (—)-3-methoxy-6α-hydroxy-N-methylmorphinan (cis) (2.0 g.) and p-toluenesulfonyl chloride (3.5 g.) in pyridine (23.2 ml.) is heated on a steam bath for 3 hours. After removal of the pyridine under reduced pressure, the resulting product is made to alkalinity with ammonia-water and shaken with ether. The ether layer is evaporated to give crude (—)-3-methoxy-6α-p-toluenesulfonyl-N-methylmorphinan (cis) (2.4 g.).

A mixture of crude (—)-3-methoxy-6α-p-toluenesulfonyl-N-methylmorphinan (cis) (2.3 g.) above prepared with collidine (25.5 ml.) is refluxed for 2.5 hours. After cooling, ether (50 ml.) is added to the reaction mixture, washed with 10% sodium carbonate and the ether evaporated. The resultant is subjected to steam distillation to remove the collidine. The residue is dissolved in 1% hydrochloric acid, washed with benzene, made to alkalinity with sodium carbonate and shaken with chloroform. The chloroform layer is evaporated. The residue is dissolved in benzene and chromatographed on alumina to eliminate impurities. The resulting benzene solution is evaporated and crystallized from petroleum ether to give a mixture of (—)-3-methoxy-N-methyl-Δ5-morphinan (cis) and (—)-3-methoxy-N-methyl-Δ6-morphinan (cis) (1.4 g.) as crystals melting at 80 to 82° C.

*Analysis.*—Calcd. for $C_{18}H_{23}ON$: C, 80.25; H, 8.61; N, 5.20. Found: C, 80.35; H, 8.73; N, 5.51.

The methiodide: M.P., 207 to 208° C.

The starting material of this example, (—)-3-methoxy-6α-hydroxy-N-methylmorphinan (cis), is prepared from desoxydihydrothebainone [Sawa et al.: Tetrahedron, vol. 15, p. 154 (1961)] according to the following scheme:

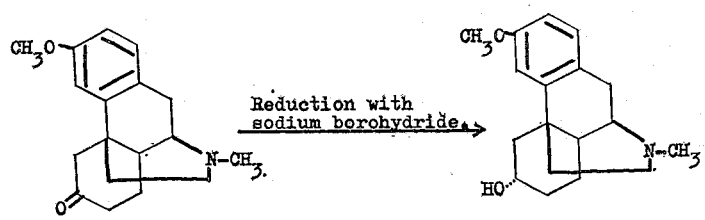

EXAMPLE 2

*Preparation of a mixture of (—)-3-methoxy-N-methyl-Δ5-morphinan (cis) and (—)-3-methoxy-N-methyl-Δ6-morphinan (cis)*

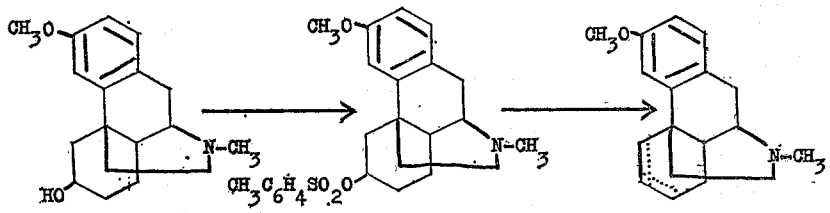

A mixture of (—)-3-methoxy-6β-hydroxy-N-methylmorphinan (cis) (1.4 g.) and p-toluenesulfonyl chloride (2.5 g.) in pyridine (17 ml.) is heated on a steam bath for 3 hours. The reaction mixture is treated as in Example 1 whereby there is obtained crude (—)-3-methoxy-6β - p - toluenesulfonyloxy - N - methylmorphinan (cis) (2.6 g.) as an oil.

A mixture of crude (—)-3-methoxy-6β-p-toluenesulfonyl-N-methylmorphinan (cis) (2.6 g.) above prepared with collidine (27 ml.) is refluxed for 2.5 hours. The reaction mixture is treated as in Example 1 whereby there is obtained a mixture of (—)-3-methoxy-N-methyl-Δ5-morphinan (cis) and (—)-3-methoxy-N-methyl-Δ6-morphinan (cis) (1.0 g.) as crystals melting at 80 to 82° C.

The starting material of this example, (—)-3-methoxy-6β-hydroxy-N-methylmorphinan (cis), is prepared from desoxydihydrothebainone [Sawa et al.: Tetrahedron, vol. 15, p. 154 (1961)] according to the following scheme:

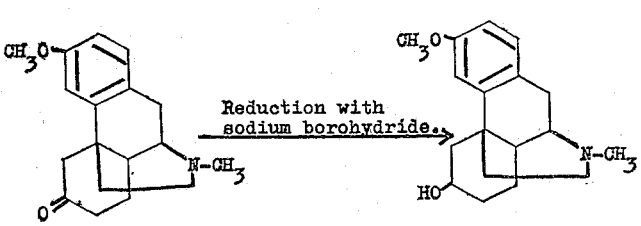

EXAMPLE 3

*Preparation of a mixture of (—)-3-methoxy-4-phenyloxy-N-methyl-$\Delta^5$-morphinan (cis) and (—)-3-methoxy-4-phenyloxy-N-methyl-$\Delta^6$-morphinan (cis)*

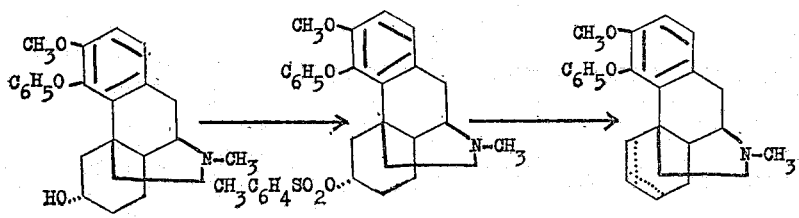

To a solution of (+)-3-methoxy-4-phenyloxy-6α-hydroxy-N-methylmorphinan (cis) (3.8 g.) in pyridine (11.5 ml.), there is added a solution of p-toluenesulfonyl chloride (2.8 g.) in pyridine (8.5 ml.), and the resultant mixture is allowed to stand at room temperature (15 to 30° C.) for 21 hours. The reaction mixture is poured onto ice-water, made to alkalinity with ammonia-water and shaken with benzene. The benzene layer is washed with water (50 ml.) and evaporated. The residue is combined with ethanol (30 ml.) and distilled to remove the pyridine. The resultant is dissolved in acetone and treated with oxalic acid to give (+)-3-methoxy-4-phenyloxy-6α-p-toluenesulfonyloxy-N-methylmorphinan (cis) oxalate (4.9 g.) as a solid melting at 158 to 159° C.

The (+)-3-methoxy-4-phenyloxy-6α-p-toluenesulfonyloxy-N-methylmorphinan (cis) (3.7 g.) obtained by treating the above prepared oxalate (4.5 g.) with aqueous sodium carbonate is added to collidine (37 ml.) and the resultant mixture refluxed for 22 hours. After cooling, the reaction mixture is washed with 10% sodium carbonate and distilled to remove the solvent. After removal of collidine by steam distillation, the resulting product (2.6 g.) is dissolved in ether and chromatographed on alumina (15 g.) to eliminate impurities. The ether solution is evaporated and crystallized from methanol to give a mixture of (—)-3-methoxy-4-phenyloxy-N-methyl-$\Delta^5$-morphinan (cis) and (—)-3-methoxy-4-phenyloxy-N-methyl-$\Delta^6$-morphinan (cis) (2.5 g.). When recrystallized from methanol, there are firstly obtained the crystals melting at 81 to 83° C. (decomp.) and showing $[\alpha]_D^{23}$ —16.7° (ethanol) and secondly the crystals melting at 87 to 89° C. (moistened at 80° C.) and showing $[\alpha]_D^{22}$ —0.5° (ethanol).

The starting material of this example, (+)-3-methoxy-4-phenyloxy-6α-hydroxy-N-methylmorphinan (cis), is prepared from (+)-3,6-dimethoxy-4-phenyloxy-N-methyl-$\Delta^{5,8}$-morphinan (cis) [Sawa et al.: Tetrahedron, vol. 15, p. 154 (1961)] according to the following scheme:

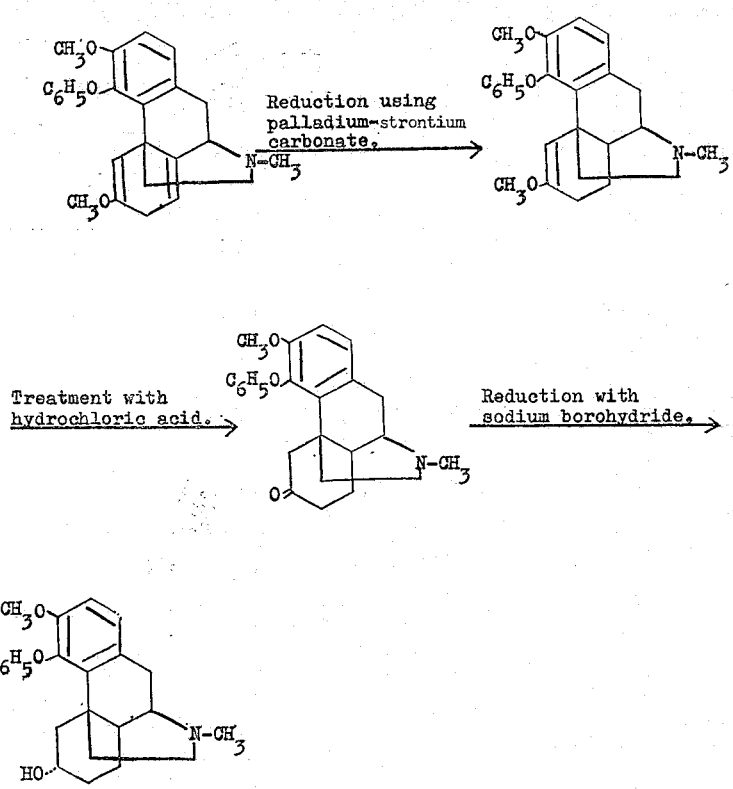

EXAMPLE 4

*Preparation of a mixture of (—)-3-methoxy-4-phenyloxy-N-methyl-Δ⁵-morphinan (cis) and (—)-3-methoxy-4-phenyloxy-N-methyl-Δ⁶-morphinan (cis)*

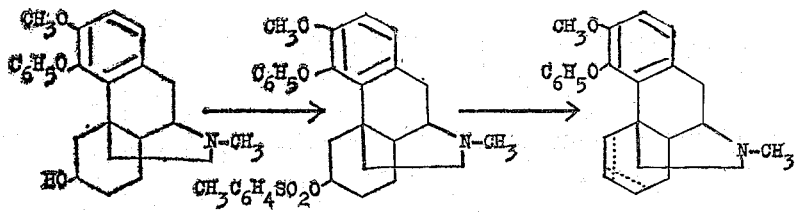

To a solution of (+)-3-methoxy-4-phenyloxy-6β-hydroxy-N-methylmorphinan (cis) (7.6 g.) in pyridine (32 ml.), there is added a solution of p-toluenesulfonyl choride (5.7 g.) in pyridine (32 ml.), and the resultant mixture is allowed to stand at room temperature (15 to 30° C.) for 14 hours. The reaction mixture is poured onto ice-water and made to alkalinity with ammonia-water. The precipitate is collected by filtration and washed with water to give crude (+)-3-methoxy-4-phenyloxy-6β-p-toluenesulfonyloxy-N-methylmorphinan (cis) (8.5 g.) as crystals melting at 174 to 175° C. The filtrate is condensed in vacuo, mixed with water and made to alkalinity with ammonia-water. The precipitate is collected by filtration and washed with water to give the additional crude crystals (1.1 g.) of the same compound. The crude crystals are combined together and recrystallized from ethanol to give the pure crystals (8.0 g.) melting at 183 to 184° C. $[\alpha]_D^{24.5}$ +17.6° (chloroform). $[\alpha]_D^{26.5}$ +52.8° (ethanol).

*Analysis.*—Calcd. for $C_{31}H_{35}O_5NS$: C, 69.77; H, 6.61; N, 2.62; S, 6.01. Found: C, 69.72; H, 6.68; N, 2.56; S, 6.09.

A solution of (+)-3-methoxy-4-phenyloxy-6β-p-toluenesulfonyloxy-N-methylmorphinan (cis) (4.0 g.) prepared above in collidine (40 ml.) is refluxed for 25 hours. After cooling, the reaction mixture is combined with ether (50 ml.), washed with 10% sodium carbonate and the solvent removed by distillation and steam distillation. The residue is dissolved in ether and chromatographed on alumina (15 g.) to eliminate impurities. The resultant ether solution is evaporated and crystallized from methanol to give a mixture of (—)-3-methoxy-4-phenyloxy-N-methyl-Δ⁵-morphinan (cis) and (—)-3-methoxy-4-phenyloxy-N-methyl-Δ⁶-morphinan (cis) (2.8 g.) as crystals melting at 87 to 89° C. (moistened at 80° C.).

The starting material of this example, (+)-3-methoxy-4-phenyloxy-6β-hydroxy-N-methylmorphinan (cis), is prepared from (+)-3-methoxy-4-phenyloxy-6-oxo-N-methylmorphinan (cis) [cf. Example 3 of this specification] according to the following scheme:

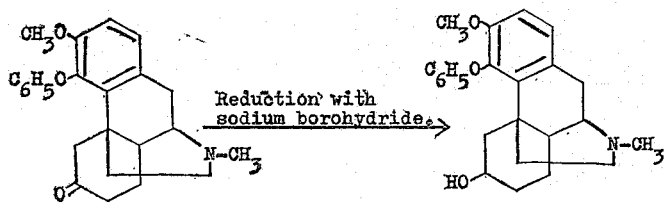

EXAMPLE 5

*Preparation of a mixture of (+)-3-methoxy-4-phenyloxy-N-methyl-Δ⁶-morphinan (cis) and (+)-3-methoxy-4-phenyloxy-N-methyl-Δ⁷-morphinan (cis)*

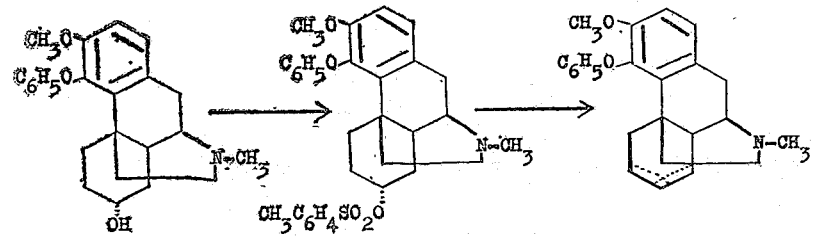

To a solution of (+)-3-methoxy-4-phenyloxy-7α-hydroxy-N-methylmorphinan (cis) (2.0 g.) in pyridine (10 ml.), there is added a solution of p-tolenesulfonyl chloride (1.5 g.) in pyridine (6 ml.), and the resultant mixture is allowed to stand at room temperature (15 to 30° C.) for 12 hours. The reaction mixture is treated as in Example 4 whereby (+)-3-methoxy-4-phenyloxy-7α-p-toluenesulfonyloxy-N-methylmorphinan (cis) (2.1 g.) is obtained.

A solution of (+)-3-methoxy-4-phenyloxy-7α-p-toluene-sulfonyloxy-N-methylmorphinan (cis) (2.1 g.) above prepared in collidine (20 ml.) is refluxed for 2.5 hours. The reaction mixture is treated as in Example 4 whereby a mixture of (+)-3-methoxy-4-phenyloxy-N-methyl-Δ⁶-morphinan (cis) and (+)-3-methoxy-4-phenyloxy-N-methyl-Δ⁷-morphinan (cis) (1.4 g.) is obtained as crystals melting at 95 to 96° C. (moistened at 84° C.) (crystallized from methanol). $[\alpha]_D^{22.5}$ +15.8± 2° (ethanol).

The starting material of this example, (+)-3-methoxy-4-phenyloxy-7α-hydroxy-N-methylmorphinan (cis), is prepared from sinomenine 4-phenyl ether [Sawa et al.: Tetrahedron, vol. 15, p. 144 (1961)] according to the following scheme:

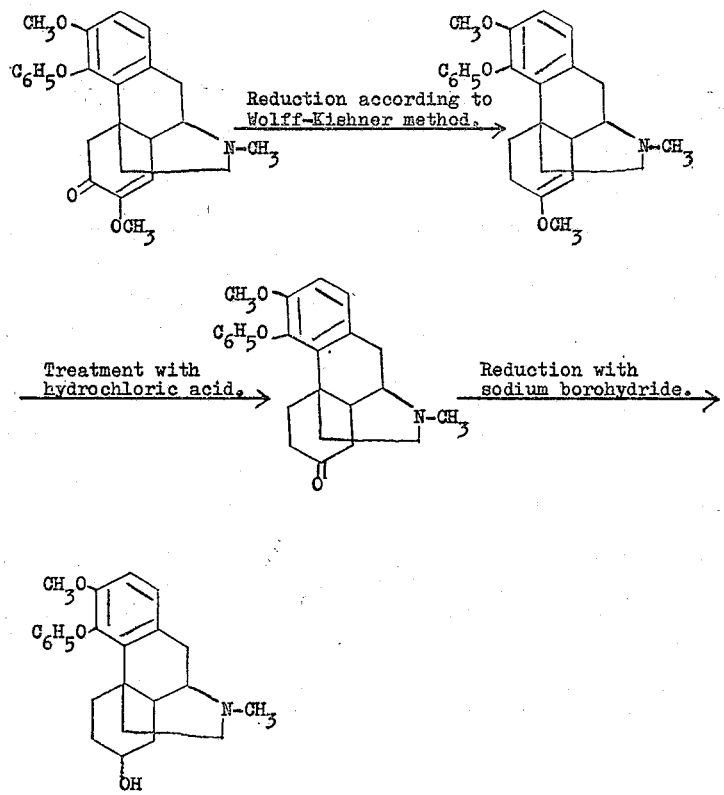

What is claimed is:
1. +()-3-methoxy-4-phenyloxy-6α-p-toluenesulfonyloxy-N-methylmorphinan (cis).
2. (+)-3-methoxy-4-phenyloxy-6β-p-toluenesulfonyloxy-N-methylmorphinan (cis).
3. (+)-3-methoxy-4-phenyloxy-7α-p-toluenesulfonyloxy-N-methylmorphinan (cis).
4. A mixture of (a) a compound of the plane formula:

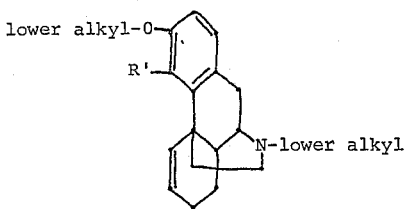

wherein R' is a member selected from the group consisting of phenyloxy, lower alkylphenyloxy, lower alkoxyphenyloxy, nitrophenyloxy and aminophenyloxy and (b) a compound of the plane formula:

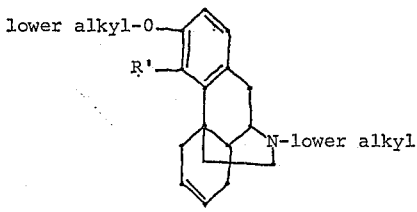

wherein R' has the precedingly-recited same significance, prepared by reacting 3-lower alkoxy-4-R'-6-sulfonyloxy-N-lower alkylmorphinan in admixture with organic base under reflux, R' having the aforesaid significance.
5. A mixture of (—)-3-methoxy-4-phenyloxy-N-methyl-Δ⁵-morphinan (cis) and (—)-3-methoxy-4-phenyloxy-N-methyl-Δ⁶-morphinan (cis), prepared by re-acting (+)-3-methoxy-4-phenyloxy-6α-p-toluenesulfonyloxy-N-methylmorphinan (cis) in admixture with collidine under reflux.
6. A mixture of (a) a compound of the plane formula:

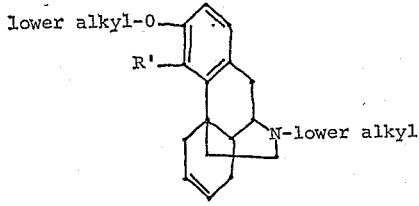

wherein R' is a member selected from the group consisting of phenyloxy, lower alkylphenyloxy, lower alkoxyphenyloxy, nitrophenyloxy and aminophenyloxy, and (b) a compound of the plane formula:

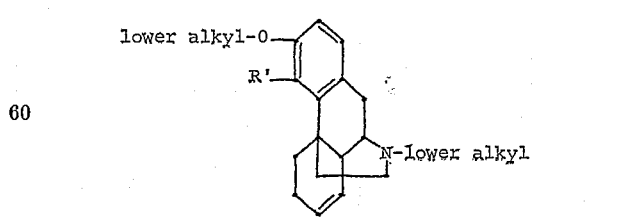

wherein R' has the precedingly-recited same significance, prepared by reacting 3-lower alkoxy-4-R'-7-sulfonyloxy-N-lower alkylmorphinan in admixture with organic base under reflux, R' having the aforesaid significance.
7. A mixture of (+)-3-methoxy-4-phenyloxy-N-methyl-Δ⁶-morphinan (cis) and (+)-mehoxy-4-phenyloxy-N-methyl-Δ⁷-morphinan (cis), prepared by reacting (+)-3-methoxy-4-phenyloxy-7α-p-toluenesulfonyloxy-N-methylmorphinan (cis) in admixture with collidine under reflux.

8. A compound of the formula:

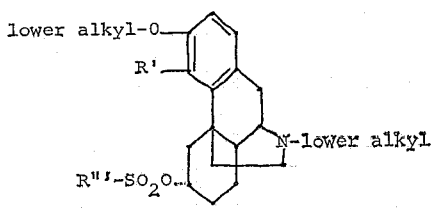

wherein R' is a member selected from the group consisting of phenyloxy, lower alkylphenyloxy, lower alkoxyphenyloxy, nitrophenyloxy and aminophenyloxy, and R''' is a member selected from the group consisting of lower alkyl, phenyl, lower alkylphenyl and phenyl(lower)alkyl.

9. A compound of the formula:

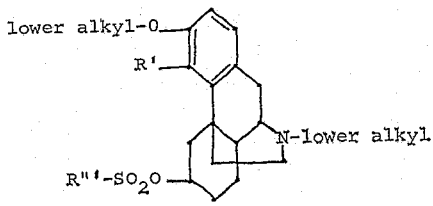

wherein R' is a member selected from the group consisting of phenyloxy, lower alkylphenyloxy, lower alkoxyphenyloxy, nitrophenyloxy and aminophenyloxy, and R''' is a member selected from the group consisting of lower alkyl, phenyl, lower alkylphenyl and phenyl(lower)alkyl.

10. A compound of the formula:

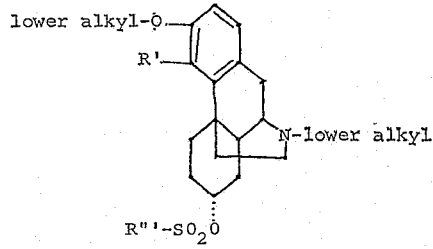

wherein R' is a member selected from the group consisting of phenyloxy, lower alkylphenyloxy, lower alkoxyphenyloxy, nitrophenyloxy and aminophenyloxy, and R''' is a member selected from the group consisting of lower alkyl, phenyl, lower alkylphenyl and phenyl(lower)alkyl.

References Cited by the Examiner

UNITED STATES PATENTS 3,085,091  4/1963  Sawa et al. _____260—285

OTHER REFERENCES

Gates et al., J. Am. Chem. Soc., vol. 78, pp. 1380–1393 (1956).

Gates et al., J. Am. Chem. Soc., vol. 80, pp. 1186–1194 (1958).

Hartung, Industrial and Engeering Chemistry, vol. 37, pages 126–127 (1945).

NICHOLAS S. RIZZO, *Primary Examiner.*

IRVING MARCUS, *Examiner.*